Patented Dec. 29, 1942

2,306,870

UNITED STATES PATENT OFFICE 2,306,870

PROCESS FOR PREVENTING THE FORMATION OF GUMS AND RESINS IN ORGANIC LIQUIDS CONTAINING UNSATURATED HYDROCARBONS

Alfred Engelhardt, Gonzenheim, near Bad Homburg vor der Hohe, Germany; vested in the Alien Property Custodian No Drawing. Application August 22, 1939, Serial No. 291,428. In Germany March 12, 1937

4 Claims. (Cl. 196—147)

In the storage of organic liquids containing unsaturated hydrocarbons, such as hydrocarbon motor fuels containing unsaturated hydrocarbons, gums and resins frequently are formed which are detrimental to the liquids.

It has now been found that the formation of gums and resins in such liquids under storage may be prevented by treating the liquids with active carbon, e. g., by filtering the liquid through active carbon or by storing the liquid in the presence of active carbon. It appears that the active carbon not only removes the gums and resins if they are present in the liquid at the time of the treatment but also prevents or retards further gum and resin formation. Consequently the treatment may be applied to a liquid which already contains gums and resins or to a liquid which is free from gums and resins but which is suceptible to the formation of gums and resins under storage.

An example of the efficacy of the treatment is as follows:

A hydrocarbon motor fuel containing unsaturated hydrocarbons and 3 mg. of gum per 100 ccm. was found after being stored for six months in iron tanks to contain 27 mg. of gum per 100 ccm. The same motor fuel when stored in the same way with an addition of 1% of fine grained active carbon was found to contain only 5 mg. of gum per 100 ccm.

By comparison with chemical treatments, the treatment with active carbon offers the advantage that it can be carried out by simple means, no special expenditure of energy for example for distillation being required. Moreover the qualities of the organic liquid are substantially unaffected and no foreign substance is introduced into it.

The active carbon preferably is used in granular form, since in this form it is very easy to separate by filtration or mere settling. Active carbons having a high capacity for decomposing hydrogen peroxide have been found to be effective.

This application is a continuation-in-part of Serial No. 203,646, filed April 22, 1938.

I claim:

1. Process of preventing the formation of gums and resins in organic liquids containing unsaturated hydrocarbons and in which the content of gums and resins increases under normal conditions of storage which consists in storing such liquids in contact with a small amount of the order of 1% of activated carbon.

2. Process as defined in claim 1 in which the organic liquid is a hydrocarbon motor fuel.

3. Process as defined in claim 1 in which the organic liquid is a hydrocarbon motor fuel and in which it is stored in contact with the activated carbon in granular form.

4. Process of preventing the formation of gums and resins in a hydrocarbon motor fuel containing unsaturated hydrocarbons and in which the content of gums and resins increases under normal conditions of storage which consists in storing the motor fuel in contact with about 1% activated carbon having a high capacity for decomposing hydrogen peroxide.

ALFRED ENGELHARDT.